US009443431B1

(12) United States Patent
Laird et al.

(10) Patent No.: US 9,443,431 B1
(45) Date of Patent: Sep. 13, 2016

(54) SYSTEM AND METHOD FOR PREVENTING UNDESIRABLE SUBSTANTIALLY CONCURRENT SWITCHING IN MULTIPLE POWER CIRCUITS

(75) Inventors: William K. Laird, Corona, CA (US); John R. Agness, Laguna Hills, CA (US); Henry S. Ung, Tustin, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 1112 days.

(21) Appl. No.: 13/538,844

(22) Filed: Jun. 29, 2012

Related U.S. Application Data

(60) Provisional application No. 61/644,363, filed on May 8, 2012.

(51) Int. Cl.
*H02M 3/158* (2006.01)
*G08G 1/00* (2006.01)
*G06Q 30/02* (2012.01)

(52) U.S. Cl.
CPC ............ *G08G 1/20* (2013.01); *G06Q 30/0265* (2013.01)

(58) Field of Classification Search
CPC ............................. H02M 3/158; H02M 3/157
USPC .......................................... 307/112; 323/271
See application file for complete search history.

(56) References Cited

U.S. PATENT DOCUMENTS

| 6,081,435 | A | 6/2000 | Mandelcorn et al. | |
|---|---|---|---|---|
| 7,023,672 | B2 | 4/2006 | Goodfellow et al. | |
| 7,107,468 | B2 | 9/2006 | Pullen et al. | |
| 7,187,226 | B2 | 3/2007 | Audy | |
| 7,231,139 | B2 | 6/2007 | Collins, | |
| 8,115,468 | B2 | 2/2012 | Cheung et al. | |
| 8,120,203 | B2 | 2/2012 | Heineman et al. | |
| 8,710,810 | B1* | 4/2014 | McJimsey | H02M 3/1584 323/272 |
| 2004/0075600 | A1* | 4/2004 | Vera | H02J 1/102 341/166 |
| 2005/0134119 | A1 | 6/2005 | Bliley et al. | |
| 2006/0055388 | A1* | 3/2006 | Tang | H02M 3/1584 323/284 |
| 2010/0109625 | A1 | 5/2010 | Ohtake et al. | |
| 2010/0264981 | A1 | 10/2010 | Augustyniak et al. | |
| 2011/0049986 | A1* | 3/2011 | Edelson | H02M 3/158 307/31 |
| 2013/0057239 | A1* | 3/2013 | Kalje | H02M 3/1584 323/271 |
| 2015/0091539 | A1* | 4/2015 | Norling | H02M 3/158 323/271 |

OTHER PUBLICATIONS

"Cross Conduction Inhibit" downloaded from http://www.brannonelectronics.com/images/Cross%20Conduction%20Inhibit.pdf on May 14, 2012.

* cited by examiner

*Primary Examiner* — Jared Fureman
*Assistant Examiner* — Emmanuel R Dominique

(57) ABSTRACT

A power system is disclosed including a plurality of power circuits, each power circuit providing an independent power output and including a high-side driver coupled to a high-side switch and a low-side drive coupled to a low-side switch, and control circuitry coupled to each of the power circuits. The control circuitry is operable to detect a present state of each high-side and low-side switch, and prevent two or more of the high-side switches from substantially concurrently switching from a first state to a second state, or two or more of the high-side switches and one or more of the low-side switches from substantially concurrently switching from a third state to a fourth state, or two or more of the low-side switches from substantially concurrently switching from the third state to the fourth state.

32 Claims, 8 Drawing Sheets

SYSTEM AND METHOD FOR PREVENTING UNDESIRABLE SUBSTANTIALLY CONCURRENT SWITCHING IN MULTIPLE POWER CIRCUITS

CROSS REFERENCE TO RELATED APPLICATION

This application claims priority to U.S. Application No. 61/644,363, filed May 8, 2012, for "NOISE MITIGATION LOGIC AMONG MULTIPLE POWER CIRCUITRY", which is incorporated herein by reference.

BACKGROUND

In many power systems (e.g., those used in hard disk drive (HDD) and solid state drive (SSD) applications), power circuits (e.g., switching regulators) are commonly used to supply power to different components. Each power circuit typically includes multiple switches (e.g., field-effect transistors (FETs)) that switch on and off at a high frequency. For example, a power circuit (e.g., a switching regulator) may include a high-side FET coupled to a low-side FET, wherein the high-side FET switches off when the low-side FET switches on, and vice versa.

A power system may include multiple power circuits that may reside on one or more integrated circuits (ICs). These ICs typically reside on a printed circuit board assembly (PCBA) that includes ground and power planes. However, as a result of the high frequency on/off switching in the power circuits, undesirable noise can be generated and coupled into the ground and power planes of the PCBA. In instances where the switching signals from switches in multiple power circuits line up, the noise on the ground or power plane may be magnified, thereby causing electromagnetic interference (EMI) issues.

DETAILED DESCRIPTION

In many Application Specific Integrated Circuit (ASIC) devices (e.g., those used in HDD and SSD applications), power circuits (e.g., switching regulators) are commonly used to supply power to different components. Each power circuit typically introduces some amount of noise into the ground or power planes of the printed circuit board assembly (PCBA) in which the power circuit is used. There are instances where the switching signals from multiple power circuits line up in time and the noise on the ground or power plane is magnified. This can cause electromagnetic interference (EMI) issues. For example, in an HDD application, if and when the switching signals from multiple power circuits line up in time, the resulting noise may rise to an unacceptable level with respect to the PCBA's overall design specification.

In particular, as the form factor of HDDs and SSDs becomes smaller, the thickness of the PCBAs that are used continues to decrease. Many of such storage devices have overall thickness in the millimeter range. This leads to the ground layers of the PCBAs getting thinner. Indeed, sometimes ground layers are removed all together to achieve the thickness requirement in small form factor storage devices. In either case, less copper is used for the ground plane, which can increase the overall system's susceptibility to noise. Thus there is a need to mitigate noise stemming from the operation of power circuits such as switching regulators.

One example of such noise occurs when a high-side (HS) FET turns off, at which point the recirculation current of the body diode causes the voltage to go below zero volts. A similar phenomenon occurs when a low-side (LS) FET turns off. If one or more power circuits happen to switch off substantially concurrently, the amplitude of the noise is magnified. Thus some embodiments of the invention provide control circuitry to control HS and LS switches (e.g., FETs) in multiple power circuits so as to prevent HS switches from turning on or off substantially concurrently, and the LS switches from turning off substantially concurrently. In other embodiments, this concept is application to charge pumps used in, for example, ASICs.

Certain embodiments of the invention will now be described. These embodiments are presented by way of example only, and are not intended to limit the scope of the invention. Various omissions, substitutions and changes in the form of the universal test connector and disk drive tester described herein may be made without departing from the spirit of the invention. To illustrate some of the embodiments, reference will now be made to the figures.

Figure 1:
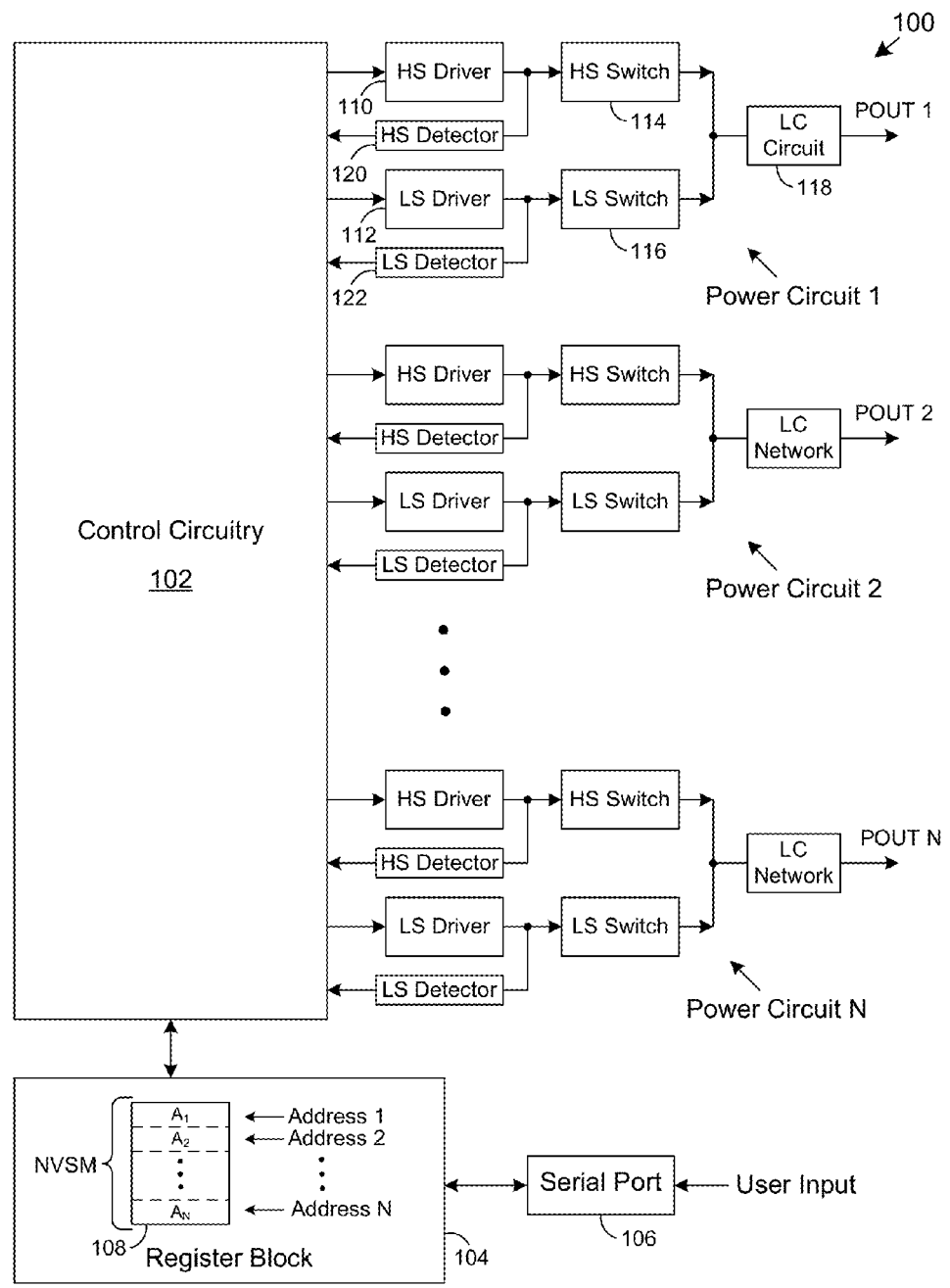
FIG. 1 shows a power system according to an embodiment of the present invention comprising control circuitry coupled to multiple power circuits and a register block.

FIG. 1 shows a power system 100 according to an embodiment of the present invention comprising control circuitry 102, a plurality of power circuits 1-N, a register block 104, and a serial port 106. In the embodiment shown in FIG. 1, each power circuit provides an independent power output (POUT) and comprises a high-side (HS) and a low-side (LS) driver, an HS and an LS switch, an HS and an LS detector, and an inductor-capacitor (LC) circuit. In the embodiment shown in FIG. 1, each power circuit comprises a switching regulator (e.g., a positive buck switching regulator, a negative switching regulator, or a buck-boost switching regulator). In an embodiment, one or more of the power circuits 1-N comprises part of a charge pump. The power circuits 1-N may be used, for example, to supply power to various components of a data storage device such as a hard disk drive (HDD) or solid state drive (SSD). For example, one power circuit may be used to supply power to a System on a Chip (SOC) controlling operations of a HDD and other power circuits may be used to supply power to other components such as servo-mechanical components. In one embodiment, the control circuitry 102, the power circuits 1-N (excluding the LC circuits), and the register block 104 reside on a common integrated circuit (IC) (e.g., an ASIC).

For each of the power circuits 1-N in the embodiment shown in FIG. 1, the control circuitry 102 is coupled to the inputs of the HS driver 110 and the LS driver 112 of the power circuit 1, the outputs of the HS driver 110 and the LS driver 112 are coupled to respective inputs of the HS switch 114 and the LS switch 116, and the outputs of the HS switch 114 and the LS switch 116 are coupled to the input of the LC circuit 118. In one embodiment, each HS and LS switch comprises a FET (e.g., an N-channel FET). In another embodiment, each HS and LS switch may comprise, for example, a P-channel FET or other suitable switching transistor or device.

In the embodiment in FIG. 1, the input of the HS detector 120 is coupled to the output of the HS driver 110 and the input of the HS switch 114, and the output of the HS detector 120 is coupled to the control circuitry 102. In an embodiment, the HS detector 120 is configured to detect the present state of the HS switch 114 (i.e., whether the HS switch 114 is on or off), and provide a signal to the control circuitry 102 indicating that state. In the embodiment in FIG. 1, the input of the LS detector 122 is coupled to the output of the LS driver 112 and the input of the LS switch 116, and the output of the LS detector 122 is coupled to the control circuitry 102. In an embodiment, the LS detector 122 is configured to detect the present state of the LS switch 116 and provide a signal to the control circuitry 102 indicating that state. In the embodiment shown in FIG. 1, the outputs of the HS switch 114 and the LS switch 116 are coupled to the input of the LC circuit 118, and the output of the LC circuit 118 provides the power output (POUT 1) of the power circuit 1. In an embodiment, the LC circuit 118 comprises an inductor and a capacitor.

In the embodiment shown in FIG. 1, the register block 104 is coupled to the control circuitry 102 and the serial port 106 and comprises a non-volatile semiconductor memory (NVSM) 108, wherein the NVSM 18 comprises a plurality of addressable memory locations $A_1$-$A_N$. The NVSM 108 may comprise, for example, flash memory or other type of NVSM. In one embodiment, each of the addressable memory locations $A_1$-$A_N$ comprises one or more settings associated with one of the HS and LS switches in each of the power circuits 1-N. In an embodiment, the one or more settings in each addressable memory location comprises a priority ranking that determines a switching order for the HS or LS switch associated with that addressable memory location with respect to the other HS and LS switches. Thus, in that embodiment each HS and LS switch has a unique priority ranking with respect to the other HS and LS switches. In one embodiment, the serial port 106 enables a user to change the priority ranking of each of the HS and LS switches in each power circuit. In one embodiment, a user can disable the priority ranking setting for each of the HS and LS switches.

In operation, the control circuitry 102 is operable to detect the present state of each HS and LS switch in each of the power circuits 1-N via a signal received from each respective HS and LS detector. The control circuitry 102 is further operable to prevent two or more of the HS switches from substantially concurrently switching on or off, or two or more HS switches and one or more LS switches from substantially concurrently switching off, or two or more LS switches from substantially concurrently switching off. In one embodiment, the control circuitry 102 is further operable to obtain a priority rank for each of the HS and LS switches from a priority setting in an associated addressable memory location $A_1$-$A_N$ in the NVSM 108 in the register block 104.

In one embodiment, the control circuitry 102 is operable to use the priority ranking to prevent two or more of the HS switches from substantially concurrently switching to the same state (on or off) by allowing the HS switch with the highest priority to switch on or off while delaying (in order of priority rank) each of the other HS switches from switching to the same state. In an embodiment, each of the other HS switches is delayed by an increasing delay time based on their priority rank. For example, if three HS switches are ready to switch on, the control circuitry 102 allows the HS switch with the highest priority to switch on, delays the HS switch with the next highest priority from switching on by a first time delay (first set amount of time), and delays the HS switch with the lowest priority from switching on by a second time delay, wherein the second time delay is longer than the first.

In one embodiment, the control circuitry 102 is operable to use the priority ranking to prevent two or more of the HS and LS switches from substantially concurrently switching off by allowing the HS switch or LS with the highest priority to switch off while delaying (in order of priority rank) each of the other HS switches from switching off. In one embodiment, the control circuitry 102 is operable to use the priority ranking to prevent two or more LS switches from substantially concurrently switching off by allowing the LS switch with the highest priority to switch off while delaying (in order of priority ranking) each of the other LS switches from switching off.

Figure 2:
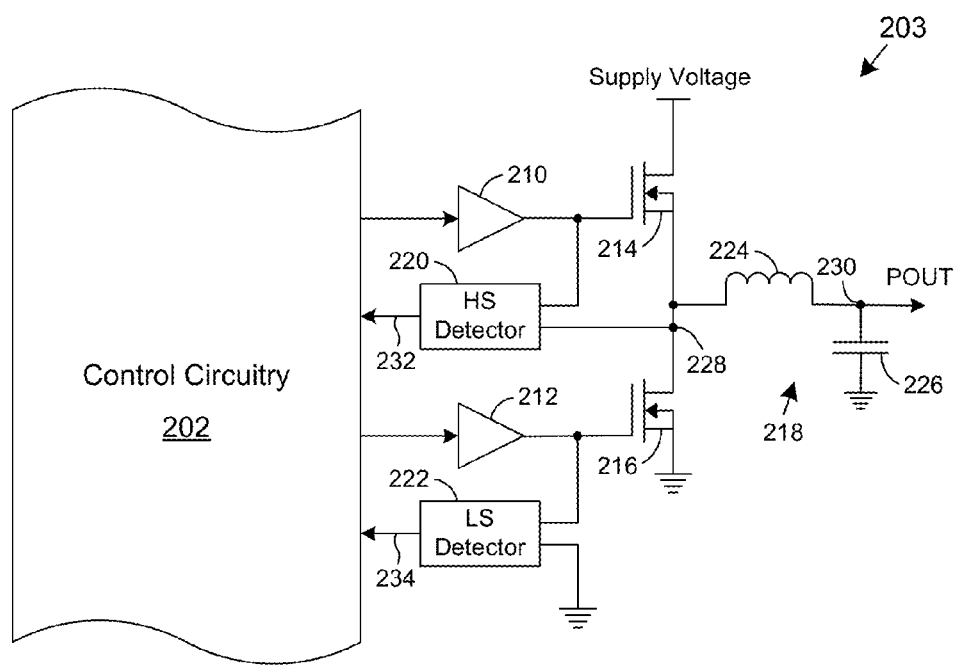
FIG. 2 shows a power circuit coupled to control circuitry according to an embodiment of the present invention.

FIG. 2 shows control circuitry 202 coupled to a power circuit 203 according to an embodiment of the present invention, wherein the power circuit 203 comprises HS driver 210, LS driver 212, HS switch 214, LS switch 216, LC circuit 218, HS detector 220, and LS detector 222. In the embodiment in FIG. 2, the LC circuit 218 comprises an inductor 224 and a capacitor 226. In one embodiment, the LC circuit 218 also comprises a feedback network in addition to an inductor and capacitor. In the embodiment in FIG. 2, the power circuit 203 comprises a switching regulator, wherein the HS switch 214 and the LS switch 216 each comprise a NFET. In another embodiment, the HS and LS switches may each comprise a PFET or other type of transistor suitable for a fast switching power application.

In the embodiment shown in FIG. 2, the control circuitry 202 is coupled to the inputs of the HS driver 210 and the LS driver 212, the outputs of the HS and LS drivers are coupled to the respective gate terminals (inputs) of the HS switch 214 (NFET) and the LS switch 216 (NFET), the drain terminal of the HS switch 214 is coupled to a supply voltage, and the source terminal of the LS switch 216 is coupled to ground. In the embodiment shown in FIG. 2, the source terminal (output) of the HS switch 214 is coupled to the drain terminal (output) of the LS switch, a first end of the inductor 224 and an input of the HS detector at node 228, the second end of the inductor 224 is coupled to a first end of the capacitor 226 at node 230, and a second end of the capacitor 226 is coupled to ground. Node 230 also provides the power output (POUT) of the power circuit 203. In the embodiment in FIG. 2, an input of the HS detector 220 is coupled to the output of the HS driver 210 and the gate terminal of the HS switch 214, the output of the HS detector 220 is coupled to the control circuitry 202, an input of the LS detector 222 is coupled to the output of the LS driver 212 and the gate terminal of the LS switch 216, another input of the LS detector is coupled to ground, and the output of the LS detector 222 is coupled to the control circuitry 202.

In the embodiment in FIG. 2, the control circuitry 202 is operable to detect the present state (on state or off state) of the HS switch 214 via a signal 232 provided by the HS detector 220, and prevent the HS switch 214 from switching on or off substantially concurrently with one or more other HS switches in other power circuits (such as power circuits 1-N shown in FIG. 1) by delaying the HS switch 214 from switching on or off if it has a lower prior rank than the other HS switches or allowing the HS switch 214 to switch on or off first if it has a higher prior rank. Similarly, the control circuitry 202 is operable to detect the present state of the LS switch 216 via a signal 234 provided by the LS detector 222, and prevent the LS switch 216 from switching off substantially concurrently with another LS or HS switch in another power circuit by delaying the LS switch 216 from switching off if it has a lower prior rank than the other LS or HS switches or allowing the LS switch 216 to switch first if it has a higher prior rank.

Figure 3A:
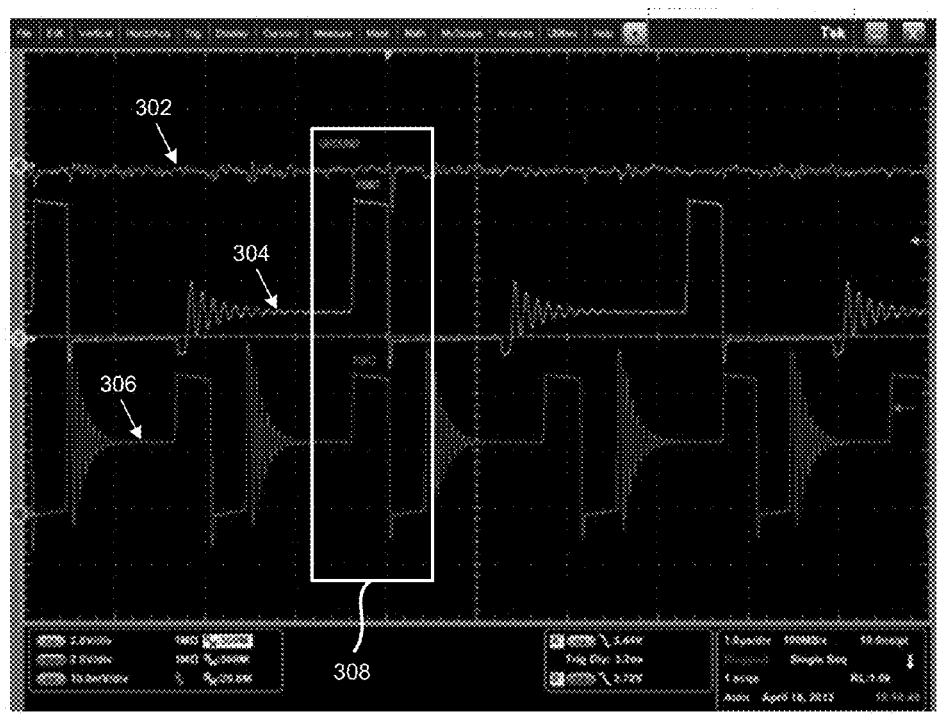
FIG. 3A shows an example noise scenario that control circuitry in the various embodiments of the invention can mitigate.

FIG. 3A shows an example noise scenario that can be mitigated by the control circuitry in various embodiments of the present invention. Shown in FIG. 3A is an oscilloscope output showing a ground signal 302, a first positive switching regulator (PSR1) signal 304, and a second PSR2 signal. As shown in FIG. 3A, When the PSR1 and PSR2 signals do not turn off at substantially the same time, the ground signal remains at approximately zero volts (0V). However, in an instance (shown by box 308) where the PSR1 and PSR2 signals both turn off substantially concurrently, a noise spike is generated that causes the ground signal 302 to extend below 0V, representing undesirable EMI noise. Embodiments of the invention would prevent the PSR1 and PSR2 signals from substantially concurrently turning off, thus mitigating this condition.

Figure 3B:
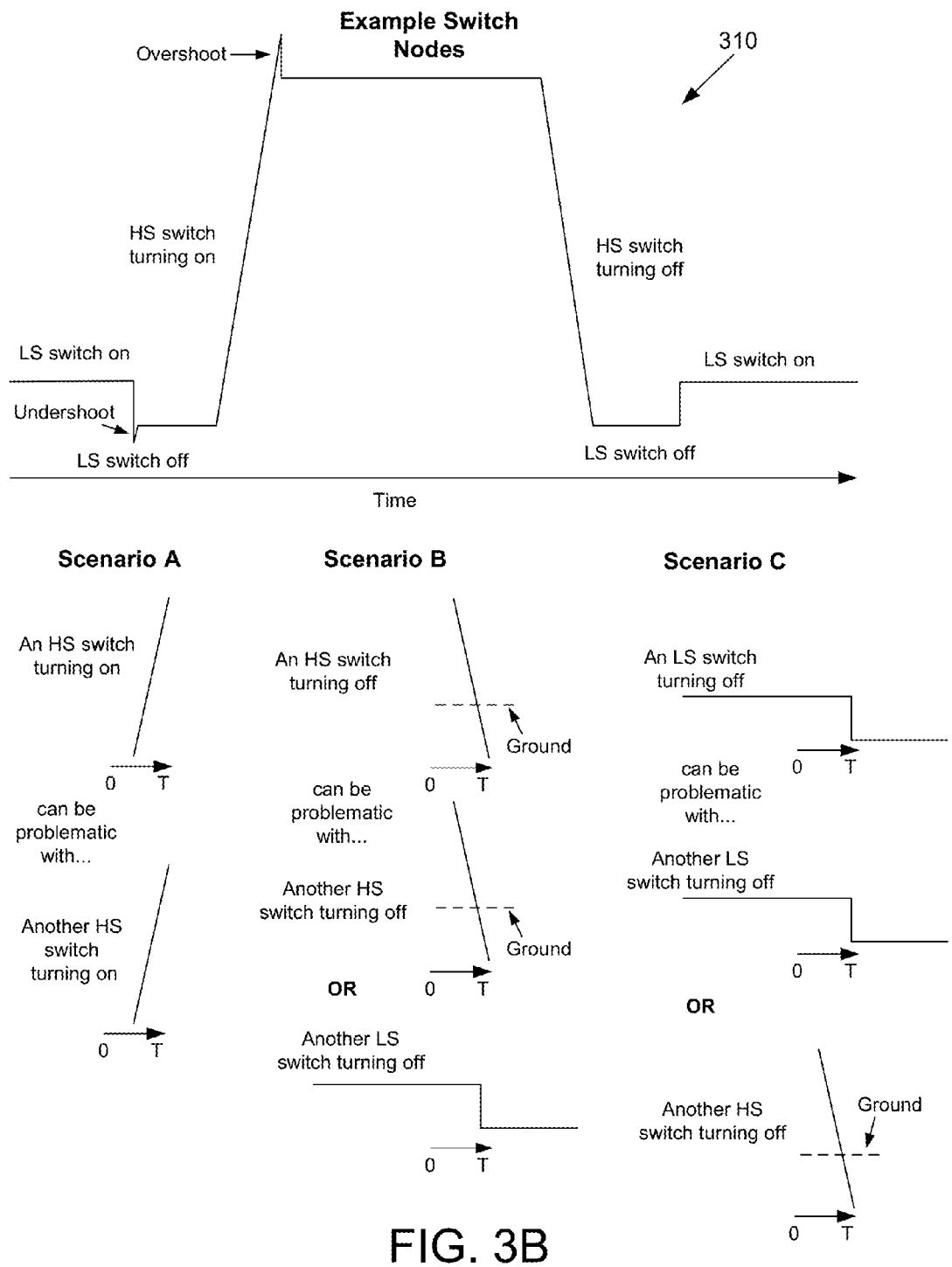
FIG. 3B shows the switch nodes in a power circuit (e.g., switching regulator) and various potential undesirable noise scenarios.

FIG. 3B shows example switch nodes in a power circuit (voltage signal graph 310), with scenarios A, B, and C showing problematic issues if there are HS and LS switches in multiple power circuits switching states substantially concurrently. In FIG. 3B, voltage signal graph 310 shows an example of overshoot that may occur when an HS switch is turning on and an example of undershoot that may occur when an LS switch is turning off. In FIG. 3B, scenarios A, B, and C are each depicted with respect to a timeline extending from 0 to T, where T indicates a time when substantially concurrent switching occurs. As shown in FIG. 3B, an HS switch turning on can be problematic if it is occurring substantially concurrently with another HS switch turning on (scenario A). An HS switch turning off can be problematic if it is occurring substantially concurrently with another HS switch turning off or another LS switch turning off (scenario B). An LS switch turning off can be problematic if it is occurring substantially concurrently with another LS switch turning off or another HS switch turning off (scenario C). Although each of the scenarios only shows the example output of two power circuits (e.g., switching regulators), those skilled in the art would understand that these are just examples and that various embodiments of the invention can address scenarios involving substantially concurrent switching of HS and/or LS switches in two or more power circuits (e.g., three, four, or more).

Figure 4A:
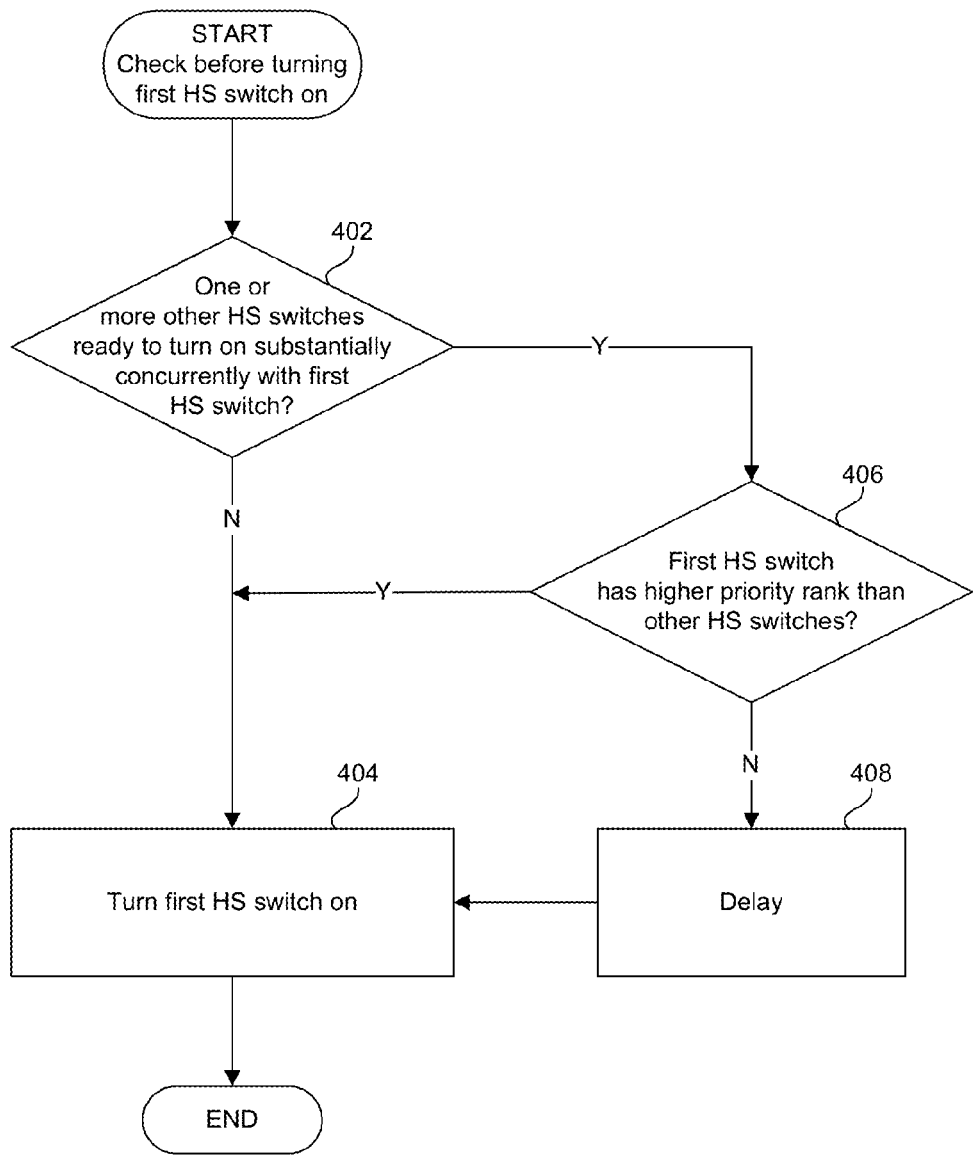
FIG. 4A is a flow diagram according to an embodiment of the present invention wherein a first high-side (HS) switch is delayed from turning on when one or more other HS switches are ready to turn on substantially concurrently with the first HS switch when the first HS switch has a lower prior than the other HS switches.

FIG. 4A is a flow diagram executed by the control circuitry 102/202 according to an embodiment of the present invention, wherein, before turning a first HS switch on, the control circuitry 102/202 checks whether it is appropriate to turn on the first HS switch by determining if one or more other HS switches are ready to turn on substantially concurrently with the first HS switch (step 402). If one or more other HS switches are not ready to substantially concurrently turn on, the control circuitry 102/202 turns the first HS switch on (step 404). If one or more other HS switches are ready to substantially concurrently turn on, the control circuitry 102/202 determines if the first HS switch has a higher priority rank than the other HS switches (step 406), and if so, turns the first HS switch on without a time delay. In this case, the control circuitry 102/202 determines the switching order of each of the other HS switches and the time delay that each will incur before turning on based on its priority rank. However, if the first HS switch does not have a higher priority rank than the other HS switches, the control circuitry 102/202 delays the first HS switch from turning on for a set time delay (step 408) and turns the first HS switch on after the time delay expires. The process shown in the flow diagram in FIG. 4A addresses the scenario A in FIG. 3B.

Figure 4B:
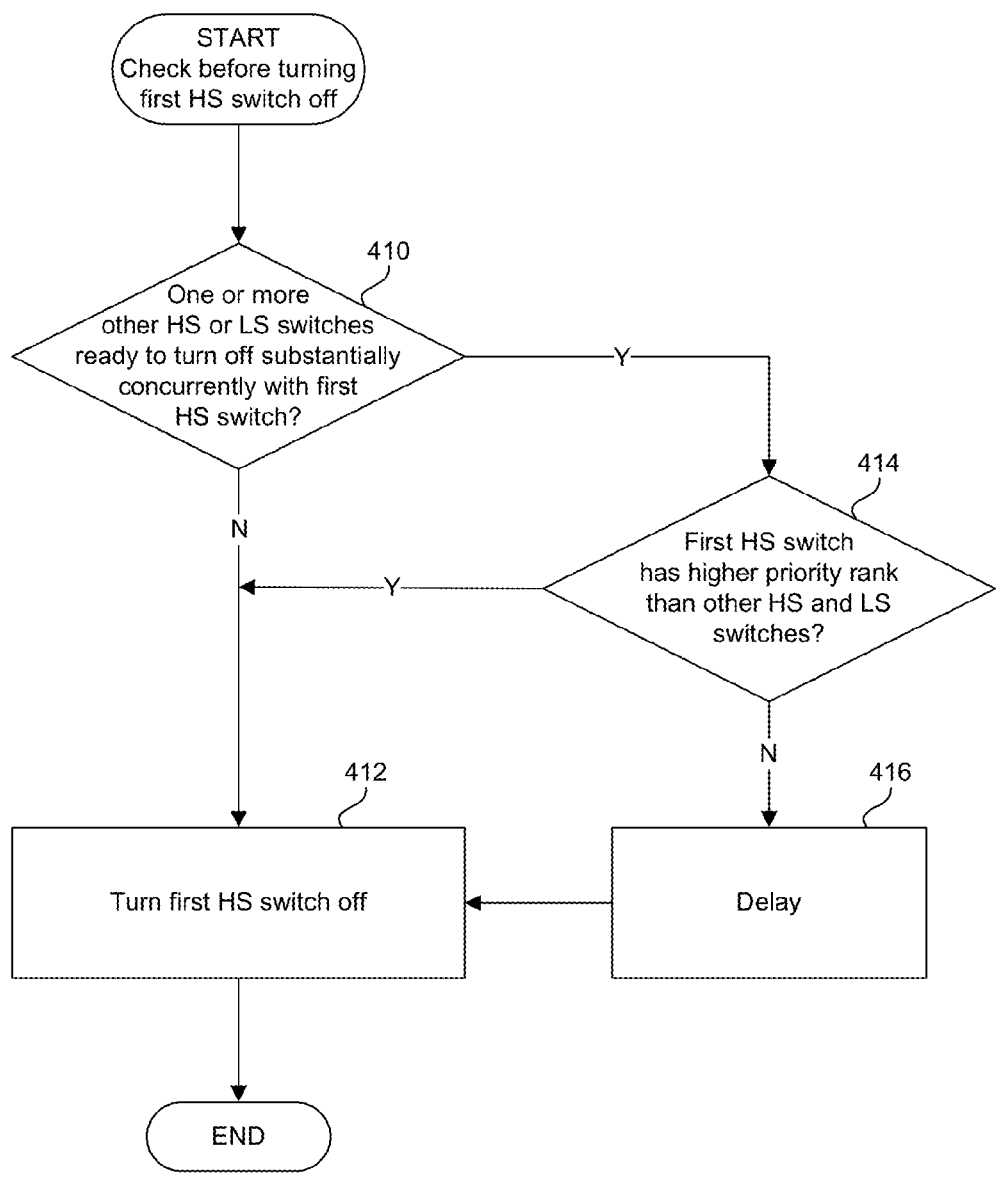
FIG. 4B is a flow diagram according to an embodiment of the present invention wherein a first high-side (HS) switch is delayed from turning off when one or more other HS or low-side (LS) switches are ready to turn on substantially concurrently with the first HS switch when the first HS switch has a lower prior than the other HS and LS switches.

FIG. 4B is a flow diagram executed by the control circuitry 102/202 according to an embodiment of the present invention, wherein, before turning a first HS switch off, the control circuitry 102/202 checks whether it is appropriate to turn off the first HS switch by determining if one or more other HS or LS switches are ready to turn off substantially concurrently with the first HS switch (step 410). If one or more other HS or LS switches are not ready to substantially concurrently turn off with the first HS switch, the control circuitry 102/202 turns the first HS switch off without a time delay (step 412). If one or more other HS or LS switches are ready to substantially concurrently turn off with the first HS switch, the control circuitry 102/202 determines if the first HS switch has a higher priority rank than the other HS and LS switches (step 414), and if so, turns the first HS switch off without a time delay. In this case, the control circuitry 102/202 determines the switching order of each of the other HS or LS switches and the time delay that each will incur before turning off based on its priority rank. However, if the first HS switch does not have a higher priority rank than the other HS and LS switches, the control circuitry 102/202 delays the first HS switch from turning off for a set time delay (step 416) and turns the first HS switch off after the time delay expires. The process shown in the flow diagram in FIG. 4B addresses the scenario B in FIG. 3B.

Figure 4C:
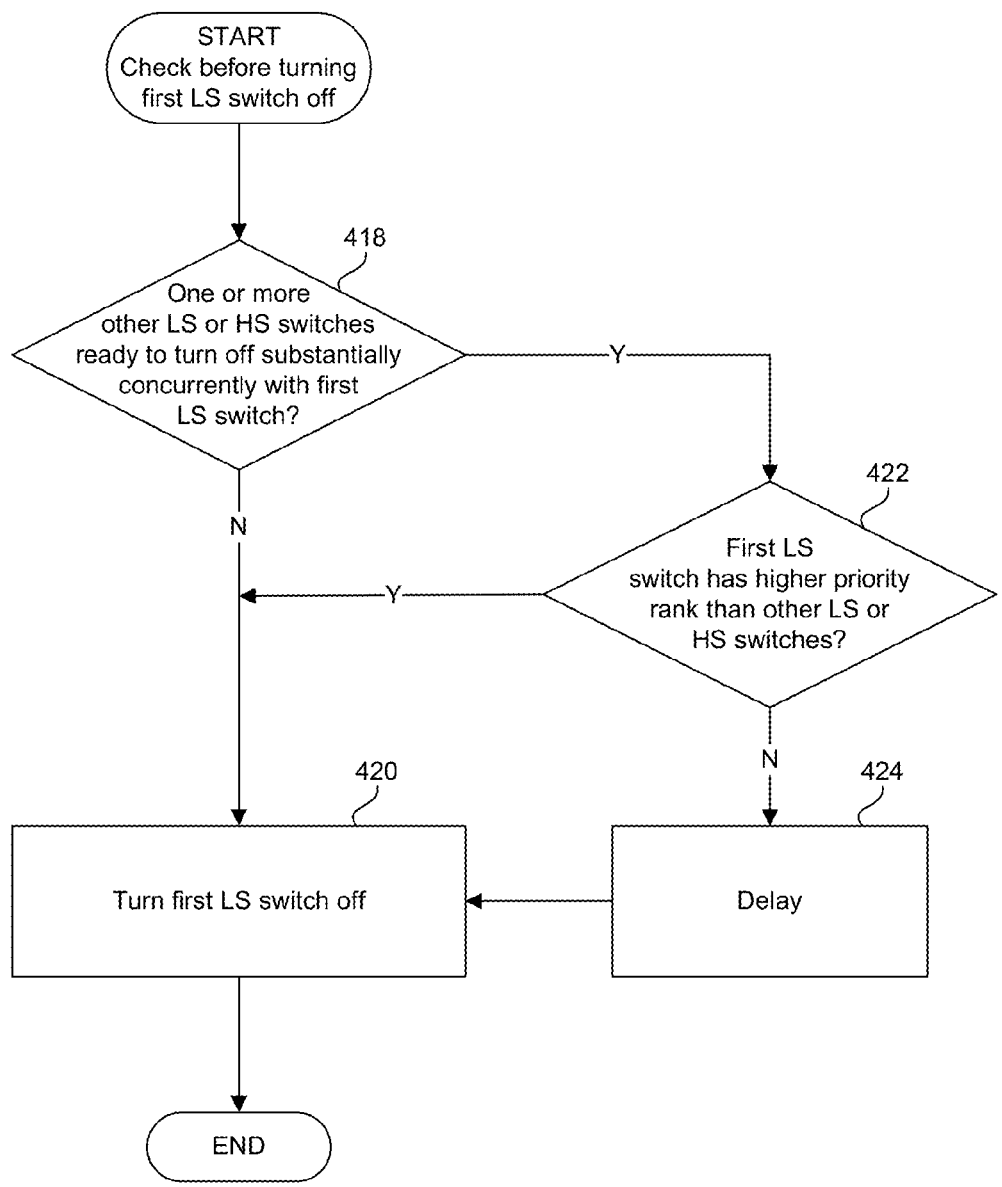
FIG. 4C is a flow diagram according to an embodiment of the present invention wherein a first LS switch is delayed from turning off when one or more other LS or HS switches are ready to turn on substantially concurrently with the first LS switch when the first LS switch has a lower prior than the other LS and HS switches.

FIG. 4C is a flow diagram executed by the control circuitry 102/202 according to an embodiment of the present invention, wherein, before turning a first LS switch off, the control circuitry 102/202 checks whether it is appropriate to turn off the first LS switch by determining if one or more other LS or HS switches are ready to turn off substantially concurrently with the first LS switch (step 418). If the one or more other LS or HS switches are not ready to substantially concurrently turn off with the first LS switch, the control circuitry 102/202 turns the first LS switch off (step 420). If the one or more other LS or HS switches are ready to substantially concurrently turn off with the first LS switch, the control circuitry 102/202 determines if the first LS switch has a higher priority rank than the other LS and HS switches (step 420), and if so, the control circuitry 102/202 turns the first LS switch off without a time delay. In this case, the control circuitry 102/202 determines the switching order of each of the other LS or HS switches and the time delay that each will incur before turning off based on its priority rank. However, if the first LS switch does not have a higher priority rank than the other LS and HS switches, the control circuitry 102/202 delays the first LS switch from turning off for a set time delay (step 424) and turns the first LS switch off after the time delay expires. The process shown in the flow diagram in FIG. 4C addresses the scenario C in FIG. 3B.

Figure 5A:
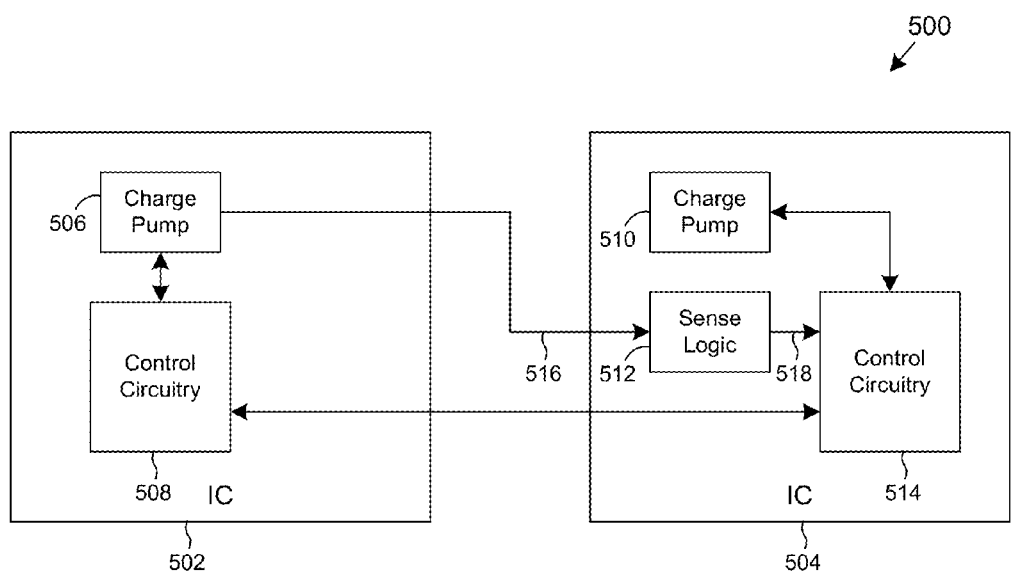
FIG. 5A shows power system according to an embodiment of the present invention comprising two integrated circuits (ICs) wherein each IC comprises a charge pump and control circuitry.

FIG. 5A shows a power system 500 according to an embodiment of the present invention comprising integrated circuits (ICs) 502 and 504, wherein IC 502 comprises a charge pump 506 and control circuitry 508, and IC 504 comprises a charge pump 510, sense logic 512, and control circuitry 514. In one embodiment, ICs 502 and 504 each comprise an ASIC (Application Specific Integrated Circuit). In the embodiment shown in FIG. 5A, charge pump 510, sense logic 512, and control circuitry 514 reside on a common IC and charge pumps 506 and 510 reside on separate ICs. In one embodiment, charge pumps 506 and 510 reside on a common IC. In the embodiment shown in FIG. 5A, control circuitry 508 is coupled to charge pump 506 and control circuitry 514, and is operable to control the operation (e.g., the turning on and off) of charge pump 506. Charge pump 506 is configured to supply power and provide an analog signal 516 indicating its present operating state (e.g., whether it is turning on or off) to sense logic 512.

In the embodiment shown in FIG. 5A, control circuitry 514 is coupled to sense logic 512 and charge pump 510, and is operable to control the operation (e.g., the turning on and off and the output) of charge pump 510 and receive a digital signal 518 from sense logic 512 indicating the present operating state of charge pump 506 (e.g., whether it is turning on or off). Sense logic 512 is configured to detect the present state of charge pump 506 via the analog signal 516 and provide the digital signal 518 to the control circuitry 514 indicating whether charge pump 506 is turning on or off. Similar to charge pump 506, charge pump 510 is also configured to supply power.

Figure 5B:
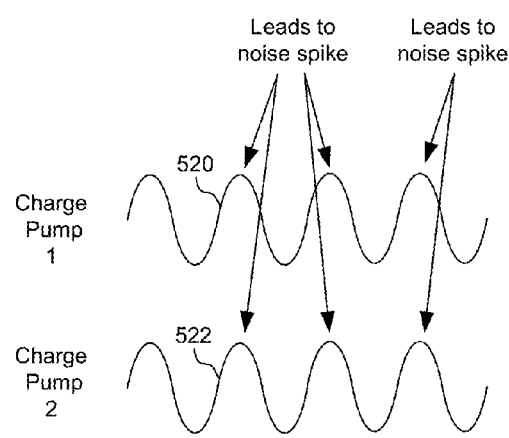
FIG. 5B shows an example noise scenario that control circuitry in the various embodiments of the invention can mitigate.

In the embodiment in FIG. 5A, if charge pump 510 is about to be turned on and the digital signal 518 received from sense logic 512 indicates that charge pump 506 is turning on, the control circuitry 514 is further operable to prevent an output of charge pump 510 from substantially aligning with an output of charge pump 506. By preventing the outputs of charge pumps 506 and 510 from substantially aligning, control circuitry 514 prevents the occurrence of a noise spike that can occur when the charge pump outputs are in substantial alignment. For example, as shown in FIG. 5B, two charge pumps can be turned on and provide outputs 520 and 522, wherein the outputs are in phase and have substantially the same frequency. As shown in the example in FIG. 5B, when the peaks of the two outputs 520 and 522 are in substantial alignment, undesirable noise spikes can occur.

In one embodiment, the control circuitry 514 is operable to prevent the output of charge pump 510 from substantially aligning with the output of charge pump 506 by delaying the turning on of charge pump 510 by a predetermined amount of time (e.g., several milliseconds). In one embodiment, the control circuitry 514 is operable to prevent the output of charge pump 510 from substantially aligning with the output of charge pump 506 by causing the output of charge pump 510 to be out of phase with the output of charge pump 506. In an embodiment, the control circuitry is operable to cause the output of charge pump 510 to be out of phase with the output of charge pump 506 by phase shifting the output of charge pump 510 by a predetermined amount of phase with respect to the output of charge pump 506. For example, the phase shift may be 90 degrees.

In another embodiment, the charge pumps can be on the same IC (e.g., ASIC), and control circuitry can prevent the output of one charge pump from substantially aligning with the output of the other charge pump, as described above in the embodiment of the invention in FIG. 5A. In yet another embodiment, external control circuitry may be coupled to the charge pumps and control their operation so as to prevent the outputs of the charge pumps from substantially aligning. The external control circuitry may be configurable to assign priority to one of the charge pumps. The same embodiment can be extended to cover multiple (three or more) charge pumps residing in the same or different ICs (e.g., ASICs).

It is noted that the steps in the flow diagrams in FIGS. 4A, 4B, and 4C are shown in a particular order to illustrate respective embodiments of the invention. In other embodiments, the steps in the flow diagrams in FIGS. 4A, 4B, and 4C may be performed in a different order. Some steps may be combined into fewer steps and some steps may be expanded into more steps.

Any suitable control circuitry may be employed in the embodiments of the present invention, such as any suitable integrated circuit or circuits. In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the control circuitry comprises suitable logic circuitry, such as state machine circuitry.

The features and attributes of the specific embodiments disclosed above may be combined in different ways to form additional embodiments, all of which fall within the scope of the present disclosure. Although certain embodiments have been disclosed, other embodiments that are apparent to those of ordinary skill in the art, including embodiments which do not provide all of the features and advantages set forth herein, are also within the scope of this disclosure. Accordingly, the scope of protection is defined only by the claims.

What is claimed is:

1. A power system comprising:
   a plurality of power circuits, each power circuit comprising:
      a high-side driver coupled to a high-side switch;
      a low-side driver coupled to a low-side switch; and
      an LC circuit coupled to the high-side and low-side switches, wherein the LC circuit provides a power output of the power circuit that is not coupled to a power output of another power circuit;
   control circuitry coupled to each of the power circuits, the control circuitry operable to:
      detect a present state of each high-side and low-side switch; and
      prevent:
         two or more of the high-side switches from substantially concurrently switching from a first state to a second state to reduce noise generated by the power circuits; or two or more of the high-side switches and one or more of the low-side switches from substantially concurrently switching from a third state to a fourth state to reduce noise generated by the power circuits; or two or more of the low-side switches from substantially concurrently switching from the third state to the fourth state to reduce noise generated by the power circuits.

2. The power system as recited in claim 1, wherein the first and fourth states are off states and the second state and third states are on states.

3. The power system as recited in claim 1, wherein the second and fourth states are off states and the second state and third states are on states.

4. The power system as recited in claim 1, wherein the control circuitry is operable to prevent two or more of the high-side switches from substantially concurrently switching from the first state to the second state by:
  determining a priority ranking for each of the high-side switches; and
  delaying one or more the high-side switches from switching from the first state to the second state based on the priority ranking.

5. The power system as recited in claim 1, wherein the control circuit is operable to prevent two or more of the high-side switches and one or more low-side switches from substantially concurrently switching from the third state to the fourth state by:
  determining a priority ranking for each of the high-side and low-side switches; and
  delaying one or more of the high-side switches or one or more of the low-side switches from switching from the third state to the fourth state based on the priority ranking.

6. The power system as recited in claim 1, wherein the control circuit is operable to prevent two or more of the low-side switches from substantially concurrently switching from the third state to the fourth state by:
  determining a priority ranking for each of the low-side switches; and
  delaying one or more of the low-side switches from switching from the third state to the fourth state based on the priority ranking.

7. The power system as recited in claim 1, wherein the high-side switch and the low-side switch in each power circuit are coupled together in a series configuration.

8. The power system as recited in claim 1, wherein each of the power circuits further comprises a high-side detector for detecting the present state of the high-side switch and comprising an input coupled between the high-side driver and the high-side switch and an output coupled to the control circuitry.

9. The power system as recited in claim 1, wherein each of the power circuits further comprises a low-side detector for detecting the present state of the low-side switch and comprising an input coupled between the low-side driver and the low-side switch and an output coupled to the control circuitry.

10. The power system as recited in claim 1, further comprising a register block coupled to the control circuitry and comprising a plurality of addressable memory locations, wherein each addressable memory location comprises one or more settings associated with one of the high-side and low-side switches in each of the power circuits.

11. The power system as recited in claim 10, wherein one of the one or more settings associated with each of the high-side and low-side switches comprises a priority ranking that determines a switching order for the high-side or low-side switch with respect to the other high-side and low-side switches.

12. The power system as recited in claim 11, further comprising a serial port coupled to the register block, wherein the serial port enables a user to change the priority ranking of each of the high-side and low-side switches.

13. The power system as recited in claim 11, further comprising a serial port coupled to the register block, wherein the serial port enables a user to disable the setting associated with each of the high-side and low-side switches comprising the priority ranking.

14. The power system as recited in claim 1, wherein each of the LC circuits comprises an inductor and a capacitor, wherein the inductor is coupled between the high-side and low-side switches and a first end of the capacitor, and a second end of the capacitor is coupled to ground.

15. The power system as recited in claim 1, wherein each of the high-side and low-side switches comprises a field effect transistor (FET).

16. The power system as recited in claim 1, wherein the control circuitry and the high-side and low-side drivers and switches in each of the power circuits reside on a common integrated circuit (IC).

17. A method of operating a power system, the power system comprising a plurality of power circuits, control circuitry coupled to each power circuit, each power circuit comprising a high-side driver coupled to a low-side switch, a low-side drive coupled to a low-side switch, and an LC circuit coupled to the high-side and low-side switches, wherein the LC circuit provides a power output of the power circuit that is not coupled to a power output of another power circuit, the method comprising:
  detecting a present state of each high-side and low-side switch; and
  preventing:
    two or more of the high-side switches from substantially concurrently switching from a first state to a second state to reduce noise generated by the power circuits; or
    two or more of the high-side switches and one or more of the low-side switches from substantially concurrently switching from a third state to a fourth state to reduce noise generated by the power circuits; or
    two or more of the low-side switches from substantially concurrently switching from the third state to the fourth state to reduce noise generated by the power circuits.

18. The method as recited in claim 17, wherein the first and fourth states are off states and the second state and third states are on states.

19. The method as recited in claim 17, wherein the second and fourth states are off states and the second state and third states are on states.

20. The method as recited in claim 17, wherein two or more of the high-side switches are prevented from substantially concurrently switching from the first state to the second state by:
  determining a priority ranking for each of the high-side switches; and
  delaying one or more of the high-side switches from switching from the first state to the second state based on the priority ranking.

21. The method as recited in claim 17, wherein two or more of the high-side switches and one or more low-side switches are prevented from substantially concurrently switching from the third state to the fourth state by:

determining a priority ranking for each of the high-side and low-side switches; and delaying one or more of the high-side switches or one or more of the low-side switches from switching from the third state to the fourth state based on the priority ranking.

22. The method as recited in claim 17, wherein two or more of the low-side switches are prevented from substantially concurrently switching from the third state to the fourth state by:

determining a priority ranking for each of the low-side switches; and delaying one or more of the low-side switches from switching from the third state to the fourth state based on the priority ranking.

23. The method as recited in claim 17, wherein the high-side switch and the low-side switch in each power circuit are coupled together in a series configuration.

24. The method as recited in claim 17, wherein each of the power circuits further comprises a high-side detector for detecting the present state of the high-side switch and comprises an input coupled between the high-side driver and the high-side switch and an output coupled to the control circuitry.

25. The method as recited in claim 17, wherein each of the power circuits further comprises a low-side detector for detecting the present state of the low-side switch and comprising an input coupled between the low-side driver and the low-side switch and an output coupled to the control circuitry.

26. The method as recited in claim 17, wherein the power system further comprises a register block comprising a plurality of addressable memory locations, wherein each addressable memory location comprises one or more settings associated with one of the high-side and low-side switches in each of the power circuits.

27. The method as recited in claim 26, wherein the one or more settings associated with each of the high-side and low-side switches comprises a priority ranking that determines a switching order for the high-side or low-side switch with respect to the other high-side and low-side switches.

28. The method as recited in claim 27, wherein the power system further comprises a serial port coupled to the register block, wherein the serial port enables a user to change the priority ranking of each of the high-side and low-side switches.

29. The method as recited in claim 27, wherein the power system further comprises a serial port coupled to the register block, wherein the serial port enables a user to disable the setting associated with each of the high-side and low-side switches comprising the priority ranking.

30. The method as recited in claim 17, wherein each of the LC circuits comprises an inductor and a capacitor, wherein the inductor is coupled between the high-side and low-side switches and a first end of the capacitor, and a second end of the capacitor is coupled to ground.

31. The method as recited in claim 17, wherein each of the high-side and low-side switches comprises a field effect transistor (FET).

32. The method as recited in claim 17, wherein the high-side and low-side drivers and switches in each of the power circuits reside on a common integrated circuit (IC).

* * * * *

UNITED STATES PATENT AND TRADEMARK OFFICE
CERTIFICATE OF CORRECTION

PATENT NO. : 9,443,431 B1  
APPLICATION NO. : 13/538844  
DATED : September 13, 2016  
INVENTOR(S) : Laird et al.

Page 1 of 1

It is certified that error appears in the above-identified patent and that said Letters Patent is hereby corrected as shown below:

In the Specification

Column 2, Line 51, "application" is replaced with --applied--.

Column 2, Line 57, "universal test connector and disk drive tester" is replaced with --power systems--.

Signed and Sealed this
Fourth Day of July, 2017

Joseph Matal
*Performing the Functions and Duties of the*
*Under Secretary of Commerce for Intellectual Property and*
*Director of the United States Patent and Trademark Office*